United States Patent [19]

Ishibashi et al.

[11] Patent Number: 5,579,313
[45] Date of Patent: Nov. 26, 1996

[54] METHOD OF MULTIPLEXING SPEECH SIGNAL AND CONTROL SIGNAL IN ISDN B-CHANNELS FOR AN EXCHANGE SYSTEM

[75] Inventors: Masaaki Ishibashi, Tama; Kazuhisa Shimazaki, Moriguchi; Satoshi Hioki, Amazaki; Tsutomu Shimasue, Yokohama, all of Japan

[73] Assignee: Fujitsu Limited, Kawasaki, Japan

[21] Appl. No.: 983,115

[22] Filed: Nov. 27, 1992

Related U.S. Application Data

[63] Continuation of Ser. No. 537,239, Jun. 13, 1990, abandoned.

[30] Foreign Application Priority Data

Jun. 13, 1989  [JP]  Japan ................... 1-150066

[51] Int. Cl.$^6$ ................................... H04Q 11/04
[52] U.S. Cl. ................. 370/62; 370/60; 370/94.1; 370/110.1; 379/156
[58] Field of Search ................. 370/58.1, 58.2, 370/58.3, 62, 110.1, 110.2, 95.1, 68, 112, 67, 60, 124, 94.1; 379/156

[56] References Cited

U.S. PATENT DOCUMENTS

| | | | |
|---|---|---|---|
| 4,013,840 | 3/1977 | Anderson | 370/124 |
| 4,271,508 | 6/1981 | Schenk | 370/112 |
| 4,521,879 | 6/1985 | Gueldenpfennig et al. | 370/62 |
| 4,580,259 | 4/1986 | Harada et al. | . |
| 4,635,253 | 1/1987 | Urui et al. | 370/67 |
| 4,704,716 | 11/1987 | Bowers et al. | 370/60 |
| 4,727,541 | 2/1988 | Mori et al. | 370/112 |
| 4,740,955 | 4/1988 | Litterer et al. | 370/67 |
| 4,763,317 | 8/1988 | Lehman et al. | 370/60 |
| 4,849,971 | 7/1989 | Karras et al. | 370/110.1 |
| 4,933,934 | 6/1990 | Aikoh et al. | 370/112 |
| 5,051,982 | 9/1991 | Brown et al. | 370/58.2 |
| 5,124,976 | 6/1992 | Lemaistre et al. | 370/110.1 |
| 5,144,620 | 9/1992 | Ishizaki et al. | 370/112 |
| 5,204,861 | 4/1993 | Wiebe | 379/156 |
| 5,214,650 | 5/1993 | Renner et al. | 370/112 |
| 5,268,904 | 12/1993 | Umeda | 370/110.1 |

FOREIGN PATENT DOCUMENTS

| | | | |
|---|---|---|---|
| 1577461 | 4/1977 | United Kingdom | H04M 3/60 |
| WO79/000316 | 7/1979 | WIPO | H04M 3/62 |
| WO86/06901 | 11/1986 | WIPO | H04M 3/60 |

Primary Examiner—Douglas W. Olms
Assistant Examiner—Shick Hom
Attorney, Agent, or Firm—Staas & Halsey

[57] ABSTRACT

A private branch exchange system having connected thereto a telephone line of a public telephone network, a plurality of extensions, and at least one attendant console. The private branch exchange system has an attendant console control circuit corresponding to each of the attendant consoles in a main frame of the private branch exchange system. A speech signal from a speech path exchange circuit and control signals are multiplexed at the attendant console control circuit to be sent through a transmission line to the corresponding attendant console, and a speech signal and control signals from the attendant console are multiplexed at the attendant console to be sent through a transmission line to the corresponding attendant console control circuit.

10 Claims, 4 Drawing Sheets

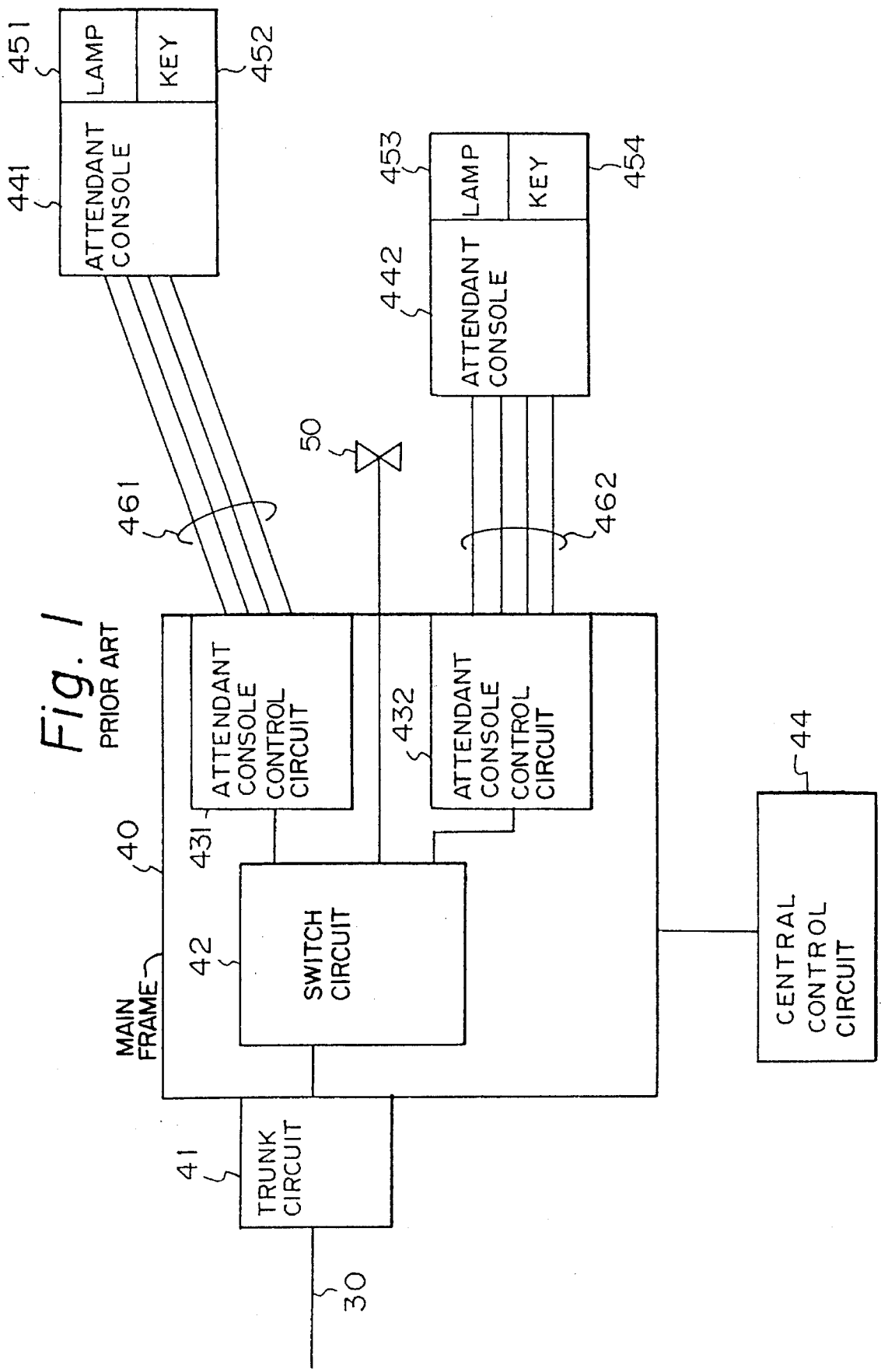

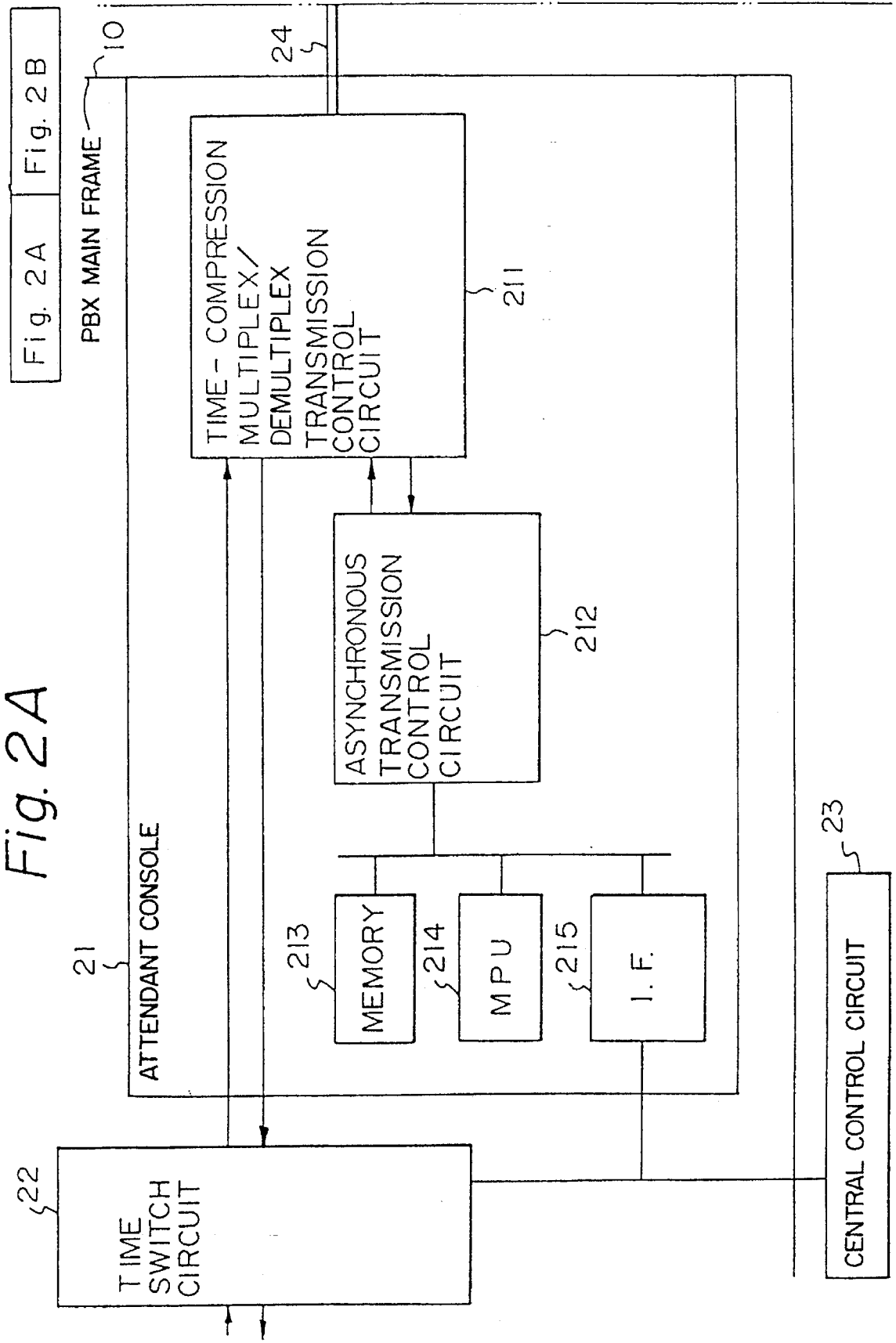

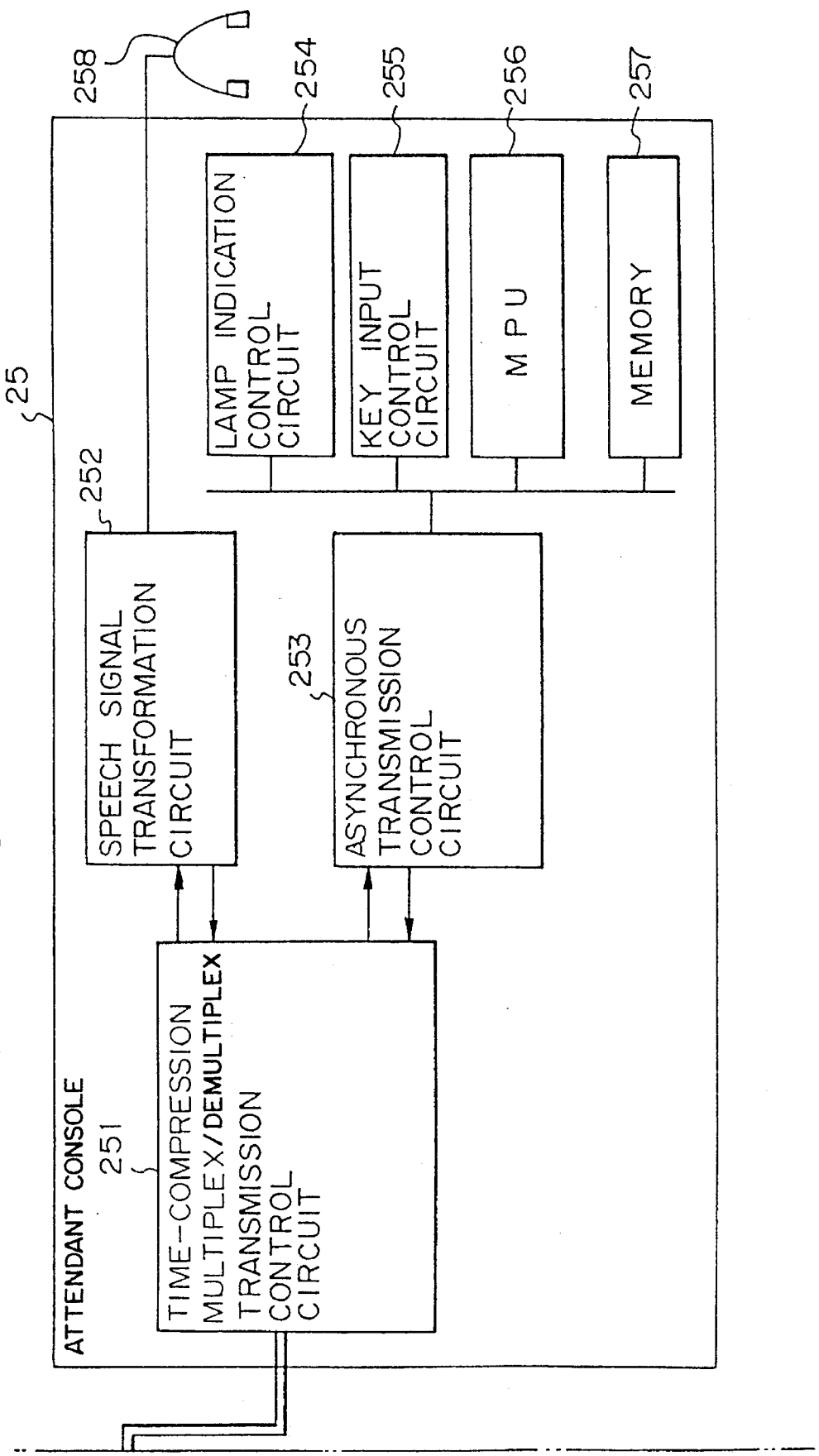

METHOD OF MULTIPLEXING SPEECH SIGNAL AND CONTROL SIGNAL IN ISDN B-CHANNELS FOR AN EXCHANGE SYSTEM

This application is a continuation of application Ser. No. 07/537,239, filed Jun. 13, 1990, now abandoned.

BACKGROUND OF THE INVENTION

(1) Field of the Invention

The present invention relates to a private branch exchange system having connected thereto an attendant console and a plurality of extensions.

In private branch exchange systems, an attendant console is connected thereto for responding to an incoming call from a telephone line which is connected with a public telephone network, and calling a party on an extension to which a calling party requests to speak. Conventionally, in middle or large-size private branch exchange systems, a plurality of attendant consoles are provided in an attendant console room which is located near the main frame of the private branch exchange system. However, recently, in many factories and offices, the plurality of attendant consoles are located dispersively, for example, in reception offices and secretaries' offices in a plurality of divisions or departments. Generally, a large number of control signals are required to be transmitted between the main frame of the private branch exchange system and the attendant console through long distances.

(2) Description of the Related Art

FIG. 1 shows a construction of a conventional private branch exchange system. In FIG. 1, reference numeral 30 denotes a public telephone line, 40 denotes the main frame of the private branch exchange system, 41 denotes a trunk circuit connecting with the public telephone line, 42 denotes a switch circuit, 431 and 432 each denote an attendant console control circuit, 44 denotes a central control circuit, 441 and 442 each denote an attendant console, 461 and 462 each denote a set of transmission lines connected between an attendant console and the main frame of the private branch exchange system, 451 and 453 each denote a lamp indicating portion, 452 and 454 each denote a key input portion, and 50 denotes an extension.

In the construction of FIG. 1, when a call is incoming in the trunk circuit 41, the central control circuit 44 sends a control signal which indicates that a call is incoming to all the attendant consoles 441 and 442 through the corresponding attendant console control circuits 431 and 432. Responding to the signal, lamp indicators in the lamp indicating portions 451 and 453 which indicate an incoming call from the public telephone line 30, are turned on in each of the attendant consoles 441 and 442. When an operator at one of the attendant consoles 441 and 442 pushes a key the input from which generates a control signal which indicates that the operator at the attendant console will respond to the incoming call, the control signal from the attendant console is transmitted to the central control circuit 44 through the corresponding attendant console control circuit. Responding to the control signal which is first received in the central control circuit 44, the central control circuit 44 controls the switch circuit 42 to connect the above attendant console control circuit 431 from which the above control signal has been first sent to the central control circuit 44, to the trunk circuit 41. Thus, the operator at the attendant console 441 can speak with the calling party through the attendant console control circuit 431 and the trunk circuit 41, and can learn the party to which the calling party wishes to speak, by speaking with the calling party. When the operator at the attendant console 431 recognizes the party to which the calling party wishes to speak, the operator inputs the number of the extension of the party to which the calling party wishes to speak, from the key input portion 452. The number of the extension is transmitted from the attendant console 441 to the attendant console control circuit 431, and is transferred to the central control circuit 44. Receiving the number of the extension of the party to which the calling party wishes to speak, the central control circuit 44 controls the switch circuit 42 to connect the extension of the party to which the calling party wishes to speak, to the trunk circuit 41.

In the above operation, the man-machine interface at the attendant consoles 441 and 442 is realized by the keys in the key input portions 452 and 454 and the lamp indicators in the lamp indicating portions 451 and 453. The lamp indicators turn on and off responding to pushing of the keys, and it is required that the delay of the turn-on or turn-off of the lamp indicators in the response to the pushing of the keys is less than 200 msec so as to be natural to the operator.

In the prior art, the CCITT V.11 system is utilized for transmission of control signals between attendant console control circuits and corresponding attendant consoles. According to the CCITT V.11 recommendation, a balanced cable is used for transmission of control signals in each direction from an attendant console control circuit to a corresponding attendant console, and from the attendant console to the corresponding attendant console control circuit, i.e., a pair of balanced cables are laid between each of the attendant consoles 441 and 442 and the main frame 40 of the private branch exchange system, in addition to transmission lines for transmitting speech signals between each of the attendant consoles 441 and 442 and the main frame 40 of the private branch exchange system. As mentioned before, recently, the attendant consoles are located dispersively around the main frame of the private branch exchange system, and therefore, the distances between the attendant consoles and the main frame 40 of the private branch exchange system are large. However, generally, the above V11 system requires additional equipment for a long distance transmission, and the provision of the additional equipment increases cost for construction. Further, when the distances between the attendant consoles and the main frame 40 of the private branch exchange system are large, the cost in constructing the whole private branch exchange system is increased due to the above laying of the pair of balanced cables.

SUMMARY OF THE INVENTION

An object of the present invention is to provide a private branch exchange system having connected thereto an attendant console and a plurality of extensions, wherein transmission between a main frame of the system and the attendant consoles can be carried out using a small number of transmission lines, and thereby the cost for constructing the whole system is reduced.

According to the present invention, there is provided a private branch exchange system connecting a telephone line of a public telephone network and a plurality of extensions thereto, comprising a main frame, at least one attendant console, and a transmission line, provided for each attendant console. The main frame comprises a trunk circuit, a switch circuit, a central control circuit, and at least one attendant console control circuit. Each of the above attendant console responds to an incoming call, receives a speech signal from a calling party, sends a speech signal to the calling party, inputs control information for transferring an incoming call to one of the plurality of extensions, sends control signals to the central control circuit, and receives control signals from the central control circuit. Each of the transmission line connects the attendant console with the corresponding attendant console control circuit and, transmits the control signals between the attendant console with the corresponding attendant console control circuit. The trunk circuit is connected to the telephone line of the public telephone network. The trunk circuit receives an incoming call through the public telephone network, and transmits an incoming and outgoing speech signal. The switch circuit connects the trunk circuit with one of the attendant console and the plurality of extensions under control of the central control circuit. The central control circuit sends control signals to the attendant console and receives control signals from the attendant console, and controls the switch circuit to connect the trunk circuit with one of the attendant consoles and the plurality of extensions according to the control signal from one of the attendant consoles. Each of the attendant console control circuits comprises a first multiplex transmission circuit which multiplexes the speech signal from the switch circuit and the control signals from the central control circuit, and transmits the multiplexed signal on the transmission line. The first multiplex transmission circuit further receives a signal from the transmission line, and demultiplexes the received signal into a speech signal which is to be sent to the switch circuit, and control signals which are to be sent to the central control circuit. The attendant console further comprises a second multiplex transmission circuit which multiplexes the speech signal from the switch circuit and the control signals from the central control circuit, and transmits the multiplexed signal on the transmission line, and the second multiplex transmission circuit further receives a signal from the transmission line, and demultiplexes the received signal into a speech signal and control signals.

Further, the above first and second multiplex transmission circuits alternately and periodically send and receive the multiplexed signal through the transmission line.

Alternatively, the first and second multiplex transmission circuits send and receive the multiplexed signals through the transmission line so that the multiplexed signals from the first and second multiplex transmission circuits are transmitted simultaneously on the transmission line as a frequency division multiplex transmission.

BRIEF DESCRIPTION OF THE DRAWINGS

FIG. 1 is a block diagram of the conventional private branch exchange system having connected thereto an attendant console and a plurality of extensions;

FIGS. 2A and 2B are block diagrams of a private branch exchange system having connected thereto an attendant console and a plurality of extensions, in an embodiment of the present invention.

DESCRIPTION OF THE PREFERRED EMBODIMENTS

Figure 3:
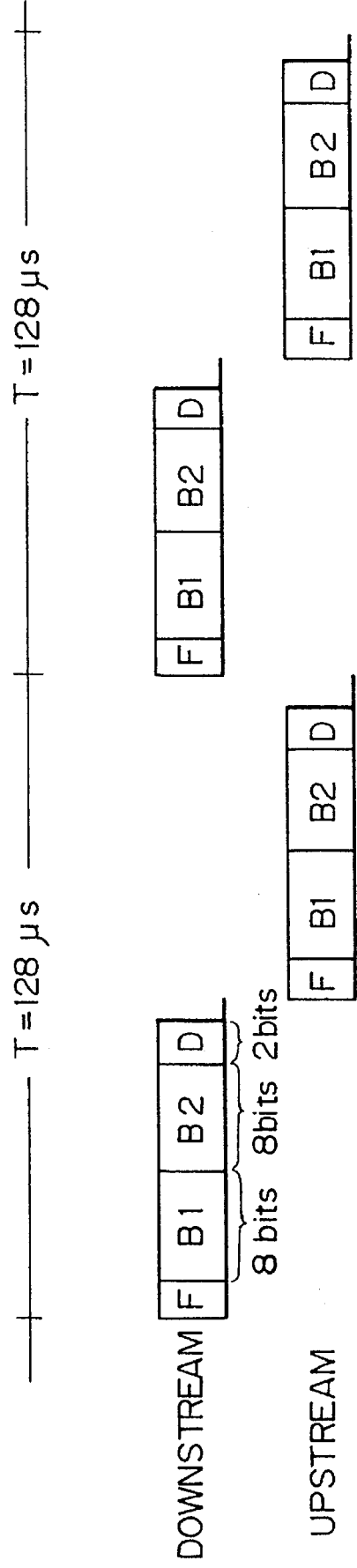
FIG. 3 shows the data format and timing in the transmission between an attendant console control circuit in the main frame of the private branch exchange system and an attendant console in the construction of FIG. 2.

FIG. 2 is a block diagram of a private branch exchange system having connected thereto an attendant console and a plurality of extensions, in an embodiment of the present invention. Only the construction including an attendant console and a corresponding attendant console control circuit, is shown in FIG. 2, and the construction of the private branch exchange system in the embodiment of the present invention which is not shown in FIG. 2, is the same as the construction of FIG. 1. In FIG. 2, reference numeral 10 denotes the main frame of the private branch exchange system, 22 denotes a switch circuit, 21 denotes an attendant console control circuit, 23 denotes a central control circuit, 25 denotes an attendant console and, 24 denotes a two-wire transmission line connected between the attendant console 25 and the main frame 10 of the private branch exchange system. Numerals 211 and 251 each denote a time compression multiplex transmission control circuit, 212 and 253 each denote an asynchronous transmission control circuit, 252 denotes a speech signal transformation circuit, 254 denotes a lamp indication control circuit, 255 denotes a key input control circuit, 214 and 256 each denote a microprocessor unit, 213 and 257 each denote a memory, and 258 denotes a headset comprising a microphone and an ear receiver.

In the construction of FIG. 2, the central control circuit 23 holds all the statuses of the private branch exchange system, sends control signals of the statuses to the attendant console control circuits (including the attendant console control circuit 21), receives control signals which are generated by key operations at the attendant consoles (including the attendant console 25), and controls the switch circuit 22 to connect the trunk circuit with one of the attendant console control circuits or extensions according to an incoming call or the control signals from the attendant consoles. When the microprocessor unit 214 in the attendant console control circuit 21 receives a control signal from the central control circuit 23 through the interface circuit 215, the microprocessor unit 214 stores the status which is indicated by the received control signal in a corresponding address in the memory 213. The memory 213 in the attendant console control circuit 21 holds the statuses of the private branch exchange system which are necessary for the corresponding attendant console 25.

The statuses held in the memory 213 are periodically sent to the corresponding attendant console 25 through the asynchronous transmission control circuit 212, the time compression multiplex transmission control circuit 211, and the two-wire transmission line 24. Each byte of the above statuses held in the memory 213 is read and is sent to the asynchronous transmission control circuit 212 as control signals in the form of parallel data under control of the microprocessor unit 214. The asynchronous transmission control circuit 212 transforms the received parallel data comprised of each eight bit portion of the above statuses, into a serial form, and sends the serial data as control signals to the time compression multiplex transmission control circuit 211 as an asynchronous transmission, for example, a start-stop transmission.

The time compression multiplex transmission control circuits 211 and 251 are provided for controlling the transmission of the control signals between the attendant console control circuit 21 and the attendant console 25 through the two-wire transmission line 24. FIG. 3 shows the data format and timing in the transmission between the attendant console control circuit 21 in the main frame 10 of the private branch exchange system and an attendant console 25 in the construction of FIG. 2. As shown in FIG. 3, the transmission between the attendant console control circuit 21 and the attendant console 25 is carried out periodically in the period of T=125 μsec. Transmission of a downstream frame from the attendant console control circuit 21 to the attendant console 25 is carried out in the first half cycle of each cycle T in a burst mode, and transmission of an upstream frame from the attendant console 25 to the attendant console control circuit 21 is carried out in the second half cycle of each cycle T in a burst mode. In each of the downstream frames and the upstream frames, "F" denotes a frame synchronization pattern, "B1" denotes a B1 channel, "B2" denotes a B2 channel, and "D" denotes a D channel, i.e., each transmission frame contains three channels. Each of the B1 and B2 channels contains 8 bits, and the D channels contains 2 bits. Namely, the transmission rate of each of the B1 and B2 channels is 64 Kbps, and the transmission rate of the D channel is 16 Kbps.

The time compression multiplex transmission control circuit 211 in the attendant console control circuit 21 receives digital speech signal (PCM signal) which has been transmitted from the calling party through the telephone line, the trunk circuit, and the switch circuit 22, and the above control signals from the asynchronous transmission control circuit 212, multiplexes the received signals in the frame as shown in FIG. 3, and sends them through the two-wire transmission line 24 to the corresponding attendant console 25, in the above first half cycle. The time compression multiplex transmission control circuit 211 receives the multiplexed signal in the frames as shown in FIG. 3 through the two-wire transmission line 24 from the corresponding attendant console 25, demultiplexes the received signal into the digital speech signal (PCM signal) and the above control signals, and sends the digital speech signal (PCM signal) to the switch circuit 22, and the control signals to the asynchronous transmission control circuit 212, in the above second half cycle. The digital speech signal is transmitted to the calling party through the switch circuit 22, the trunk circuit, and the telephone line. The above digital speech signals are transmitted through the B1 channel, and the above control signals are transmitted through the B2 channel. The D channel is not used.

The asynchronous transmission control circuit 212 transforms the control signals which are received from the time compression multiplex transmission control circuit 211 into parallel one-byte data, and transfers the parallel data (control signals) to the microprocessor unit 214. When the microprocessor unit 214 receives the control signals from the asynchronous transmission control circuit 212, the received control signals are once stored in the memory 213 as a part of the statuses, and are then transferred to the central control circuit 23 through the interface circuit 215.

In the attendant console 25, the time compression multiplex transmission control circuit 251 functions in a similar manner to the above time compression multiplex transmission control circuit 211. The time compression multiplex transmission control circuit 251 receives the above multiplexed signal in the frame as shown in FIG. 3 through the two-wire transmission line 24 from the corresponding attendant console 25, demultiplexes the received signal into the digital speech signal (PCM signal) and the above control signals, and sends the digital speech signal (PCM signal) to the speech signal transformation circuit 252, and the control signals to the asynchronous transmission control circuit 253, in the above first half cycle.

The speech transformation circuit 252 receives the digital speech signal from the time compression multiplex transmission control circuit 251, and transforms the received digital speech signal into an analog speech signal. The analog speech signal is supplied to the ear receiver in the headset 258. An analog speech signal which is generated in the microphone in the headset is input into the speech signal transformation circuit 252, and is transformed to a digital speech signal to be supplied to the time compression multiplex transmission control circuit 251.

The key input control circuit 255 is provided for generating a key input signal responding to a key operation by an operator. The key input signal is once stored in the memory 257 under control of the microprocessor unit 256 as control information, and the control information which is held in the memory 257 is then transferred to the asynchronous transmission control circuit 253 as control signals under control of the microprocessor unit 256 in a parallel form. When the asynchronous transmission control circuit 253 receives the parallel control signals from the memory 257, the asynchronous transmission control circuit 253 transforms the parallel control signals into a serial form, and the control signals in the serial form are transferred to the time compression multiplex transmission control circuit 251.

The time compression multiplex transmission control circuit 251 receives the above digital speech signal from the speech signal transformation circuit 252, and the control signals from the asynchronous transmission control circuit 253, multiplexes the received signals in the frame as shown in FIG. 3, and sends the multiplexed signals through the two-wire transmission line 24 to the corresponding attendant console control circuit 21, in the above second half cycle.

When the asynchronous transmission control circuit 253 receives the above control signals from the time compression multiplex transmission control circuit 253 in a serial form, the control signals are transformed into a parallel form, and are then transferred to the memory 257 as statuses and to the microprocessor unit 256 as an asynchronous transmission. The microprocessor unit 256 stores the received control signals in the memory 257, and controls the lamp indication control circuit 254 to turn on the light indicators according to the statuses which are held in the memory 257.

In the above construction, the control signals which are transmitted from the central control circuit 23 to the attendant console 25 include, for example, a status signal indicating that a call is incoming, and the control signals which are transmitted from the attendant console 25 to the central control circuit 23, include, for example, dialing information which has been input from the key input portion of the attendant console 25 by the operator, and is transmitted from the attendant console 25 to indicate a number of an extension of a party to which a calling party wishes to speak. All control signals are repeatedly transmitted between the attendant console control circuit 21 and the attendant console 25, and each status held in each of the memories 214 and 256 in the attendant console control circuit 21 and the attendant console 25, is renewed every time a corresponding control signal is received in the attendant console control circuit 21 and the attendant console 25, respectively. Thus, even if a bit of the control signals is erroneously transmitted, an erroneous status corresponding the erroneously transmitted bit is once written in the memory 214 or 257, however, it is then renewed by a correct status when a correct bit corresponding to the above erroneously transmitted bit is transmitted in the next transmission cycle.

Using the above construction for the transmission between the attendant console control circuit and the attendant console, an operation for attending to an incoming call in the private branch exchange system which is similar to the operation explained before with reference to FIG. 1, is carried out in the embodiment of the present invention.

As explained above, according to the present invention, both the speech signals and the control signals can be transmitted through a common transmission line as a time-divisionally multiplexed signal between the attendant console and the attendant console control circuit. Therefore, the number of the cables which are necessary to be laid between the attendant console and the attendant console control circuit, can be reduced, and the cost for constructing the whole private branch exchange system is reduced. Further, according to the above time compression multiplex transmission system, the transmission of the speech signals and the control signals in both directions between the attendant console and the attendant console control circuit can be carried out using only a two-wire transmission line. Although the time compression multiplex transmission is used in the above embodiment, any other transmission system wherein transmission of signals in both directions is possible using only one transmission line, for example, a frequency division multiplex transmission system, can be used instead of the time compression multiplex transmission system.

We claim:

1. A method for use in an exchange system provided with first and second information signals, and generating first and second control signals, said exchange system including an attendant console and an attendant console control circuit which are coupled together by a two-way transmission line including a signalling channel and a plurality of information channels in both an upstream frame and a downstream frame, the method comprising the steps of:

a) multiplexing the first information signal and the first control signal including at least one of a first display signal, a lamp signal and a first incoming call ringing signal, from the attendant console control circuit, to produce a first multiplexed signal, the first information signal and the first control signal being multiplexed in first and second information channels, respectively, the first and second information channels each having respective bandwidths larger than a bandwidth of the signalling channel;

b) transmitting the first multiplexed signal from the attendant console control circuit to the attendant console on the downstream frame of the two-way transmission line;

c) multiplexing the second information signal and the second control signal including a key signal, to produce a second multiplexed signal, the second information signal and the second control signal being multiplexed in third and fourth voice information channels, respectively, the third and fourth information channels each having respective bandwidths larger than a bandwidth of the signalling channel; and d) transmitting the second multiplexed signal from the attendant console to the attendant console control circuit on the upstream frame of the two-way transmission line.

2. A method for use in an exchange system which is provided with an information signal, and which generates a control signal, said exchange system including an attendant console and an attendant console control circuit which are coupled together by a transmission line, the method comprising the steps of:

a) multiplexing the information signal and the control signal including at least one of a display signal, a lamp signal and an incoming call ringing signal, to produce a multiplexed signal, the information signal and the control signal being multiplexed in first and second integrated services digital network (ISDN) standard B-channels, respectively, of the multiplexed signal; and b) transmitting the multiplexed signal from the attendant console control circuit to the attendant console on the transmission line.

3. A method for use in an exchange system which is provided with an information signal, and which generates a control signal, said system including an attendant console and an attendant console control circuit which are coupled together by a transmission line including a plurality of B-channels, the method comprising the steps of:

a) multiplexing the information signal and the control signal including a key signal, to produce a multiplexed signal, the information signal and the control signal being multiplexed in first and second B-channels, respectively, of the multiplexed signal; and b) transmitting the multiplexed signal from the attendant console to the attendant console control circuit on the transmission line.

4. A system supplied with first and second information signals and generating first and second control signals, said exchange system including an attendant console and an attendant console control circuit which are coupled together by a two-way transmission line, including a signalling channel and a plurality of information channels in both an upstream frame and a downstream frame, said system comprising:

the attendant console control circuit for multiplexing the first information signal and the first control signal, including at least one of a display signal, a lamp signal, and an incoming call ringing signal, in first and second information channels, respectively, and demultiplexing the second multiplexed signal into the second information signal and the second control signal; and the attendant console, coupled to the attendant console control circuit, for multiplexing the second information signal and the second control signal including a key signal, into first and second information channels, respectively, and demultiplexing the first multiplexed signal into the first control signal and the first information signal, the attendant console being responsive to the first control signal, the attendant console control circuit transmitting the first multiplexed signal to the attendant console on the downstream frame of the transmission line, and the attendant console transmitting the second multiplexed signal to the attendant console control circuit on the upstream frame of the transmission line.

5. A system as claimed in claim 4, wherein the system is coupled to a telephone line for a public telephone network, the telephone line transmitting an incoming call including an incoming call ringing signal, from a calling party, further comprising:

a switch circuit operatively coupled to receive the incoming call; and a central control circuit operatively coupled to the switch circuit and the attendant console control circuit, to receive the incoming call ringing signal to transmit as the first control signal to the attendant console control circuit in a first time period, to control the switch circuit to switch the incoming call to the attendant console control circuit as the first speech signal in a second time period, based on the second control signal received from the attendant console control circuit in a third time period, and to control the switch to transmit the second speech signal to the telephone line in a fourth time period.

6. A system as claimed in claim 4, further comprising:

a central control circuit to generate the first control signal including at least one of the display signal and the lamp signal, based on the second control signal.

7. A system as claimed in claim 4, further comprising:

a transmission line coupled between the attendant console control circuit and the attendant console, for carrying the first and second multiplexed signals transmitted by the attendant console control circuit and the attendant console, respectively.

8. A system as claimed in claim 4, wherein the first control signal is received in a first time period by the attendant console which activates a lamp in the attendant console, based on the incoming call ringing signal, wherein an attendant console operator responds to the incoming call ringing signal to receive the first speech signal, in a second time period, wherein the attendant console operator determines an extension corresponding to a called party from a calling party generating the first speech signal, the extension being coupled to a switch, wherein the attendant console operator operates a key to generate a key signal transmitted as the second control signal in a third time period, and wherein a central control circuit coupled to the switch and the attendant console control circuit, controls the switch to transmit the first speech signal to the extension in a fourth time period, based on the second control signal.

9. An exchange system provided with an information signal and generating a control signal, said exchange system including an attendant console and an attendant console circuit coupled together by a transmission line, said exchange system comprising:

a multiplexer for receiving the information signal and the control signal, for multiplexing the information signal and the control including at least one of a display signal, a lamp signal and an incoming call ringing signal, to produce a multiplexed signal;

first and second integrated service digital network (ISDN) standard B-channels for multiplexing the information signal and the control signal, respectively, of the multiplexed signal; and a transmitter for transmitting the multiplexed signal from the attendant console circuit to the attendant console in the transmission line.

10. An exchange system provided with an information signal and generating a control signal, said exchange system including an attendant console and an attendant console control circuit coupled together by a transmission line and including a plurality of B-channels, said exchange system comprising:

a multiplexer for receiving the information signal and the control signal including a key signal, for producing a multiplexed signal;

first and second B-channels, connected to receive the information signal and the control signal, for multiplexing the information signal and the control signal, respectively, of the multiplexed signal; and a transmitter, connected to secure the multiplexed signal, for transmitting the multiplexed signal from the attendant console to the attendant console circuit on the transmission line.

* * * * *